United States Patent [19]

Bohman

[11] Patent Number: 4,578,984

[45] Date of Patent: Apr. 1, 1986

[54] MACHINE FOR DEFORMING THE GULLETS OF SAW BLADES TO IMPROVE RESISTANCE TO FATIGUE STRESS

[75] Inventor: Karl-Erik Bohman, Munkfors, Sweden

[73] Assignee: Uddeholm Strip Steel Aktiebolag, Munkfors, Sweden

[21] Appl. No.: 586,252

[22] Filed: Mar. 5, 1984

[51] Int. Cl.$^4$ .................... B21D 37/10; B23D 63/00
[52] U.S. Cl. ........................ 72/416; 76/112; 76/25 R; 76/51
[58] Field of Search ............... 72/416, 317, 116; 76/112, 25 R, 51, 52, 53, 55, 77

[56] References Cited

U.S. PATENT DOCUMENTS

| | | | |
|---|---|---|---|
| 1,143,934 | 6/1915 | Begg | 76/25 R |
| 2,425,876 | 8/1947 | Hively | 76/77 |
| 2,607,243 | 8/1952 | McEwan | 76/77 |
| 2,666,347 | 1/1954 | Richardson | 76/52 |
| 2,842,012 | 7/1958 | Nelson et al. | 76/77 |
| 2,998,839 | 9/1961 | Ingwar | 72/317 |
| 3,357,462 | 12/1967 | Craven | 76/112 |
| 3,416,394 | 12/1968 | Stier et al. | 76/52 |
| 3,466,707 | 9/1969 | Click et al. | 72/317 |
| 3,803,898 | 4/1974 | Speakman | 72/416 |
| 4,018,109 | 4/1977 | Stier | 76/77 |
| 4,023,446 | 5/1977 | Annas | 76/77 |

FOREIGN PATENT DOCUMENTS

| | | |
|---|---|---|
| 1160871 | 1/1984 | Canada . |
| 2175075 | 10/1973 | France . |
| 222317 | 9/1968 | Sweden . |
| 1214259 | 12/1970 | United Kingdom . |
| 724286 | 5/1978 | U.S.S.R. ................ 76/112 |

Primary Examiner—Francis S. Husar
Assistant Examiner—David B. Jones
Attorney, Agent, or Firm—Murray and Whisenhunt

[57] ABSTRACT

A machine to deform the gullets of saw blades, thereby increasing the resistance of the saw blade to fatigue cracks, by compressing the gullet bottom, the compression being accomplished by pressing the saw blade between one fixed die and one which is pressed upon by a threaded member, said member being turned a part of a turn, thereby moving axially, by being attached to a lever arm, which is lifted and pressed down by a piston, and comprising a mechanism for advancing the saw blade one tooth pitch after each compressing cycle.

4 Claims, 7 Drawing Figures

MACHINE FOR DEFORMING THE GULLETS OF SAW BLADES TO IMPROVE RESISTANCE TO FATIGUE STRESS

TECHNICAL SCOPE

The invention relates to the field of improving the resistance of saw blades to fatigue cracks, and specifically comprises a machine to deform the gullets of saw blades, thereby inducing stress which compensates for the stress caused by extrinsic factors. The machine is especially useful for saw blades with Stellite or hard metal tipped saw teeth, and may in principle be used for most known types of saw blades, such as blades for circular, band, or frame saws.

BACKGROUND ART

Saw blades are subjected to different types of stress. A bandsaw blade is typically bent over the wheels at least twice per working cycle. The saw blade is tensioned prior to being put to use in order to compensate for the increased temperature during sawing which causes some expansion of the material. Each cut puts strain on each saw tooth. The resulting stress on the material is pulsating and the net average stress is tensile. This type of stress will often cause fatigue cracks in a material according to whether the stress cycle is contained within the Goodman diagram of the material in question or not. It is well known that by inducing residual stress in the material by deforming it, in other words by putting a strain exceeding the yield value on a small portion of the material, the resistance of the material to fatigue stress may be increased. Such application of residual stress is described in standard engineering texts and methods for deforming stressed parts of special products are described in e.g. U.S. Pat. No. 3,803,898 (1974) by E. R. Speakman, and SE 222317 (1959) by T. G. Angel. Both these methods are concerned with increasing the resistance to fatigue stress of the material around holes in sheet metal. Generally the successful application of such deformation is dependent on placing and grading the applied deforming force correctly, as otherwise reduced resistance to fatigue stress may result, if for example cracks are created already at this stage instead of being prevented from occurring later.

Saw blade gullet cracks are more frequent when the blades are not or are only seldom resharpened and when the notch is not filed when the tooth is resharpened. Obviously, small cracks in the gullets may be removed by filing and thereby the process leading to fatigue failure, which most often starts at the notch bottom, is stopped and must start afresh. Such saws which are not refiled at the notch are therefore well suited for the application of a deformation of the above described type before being put to use. The principal features of such deformation of saw blade gullets are outlined in the German published but not examined patent application DE 31 27 178A1. It is the object of this invention to provide a machine for carrying out such deformation at the exact place and with the exact amount of force needed in a simple and quick manner at a low cost per blade.

This object and other advantages and particulars of the invention will be apparent from the following description of the preferred embodiments and from the following patent claims.

BRIEF DESCRIPTION OF DRAWINGS

In the following description of preferred embodiments reference will be made to the attached drawings where.

DESCRIPTION OF PREFERRED EMBODIMENTS

Figure 1:
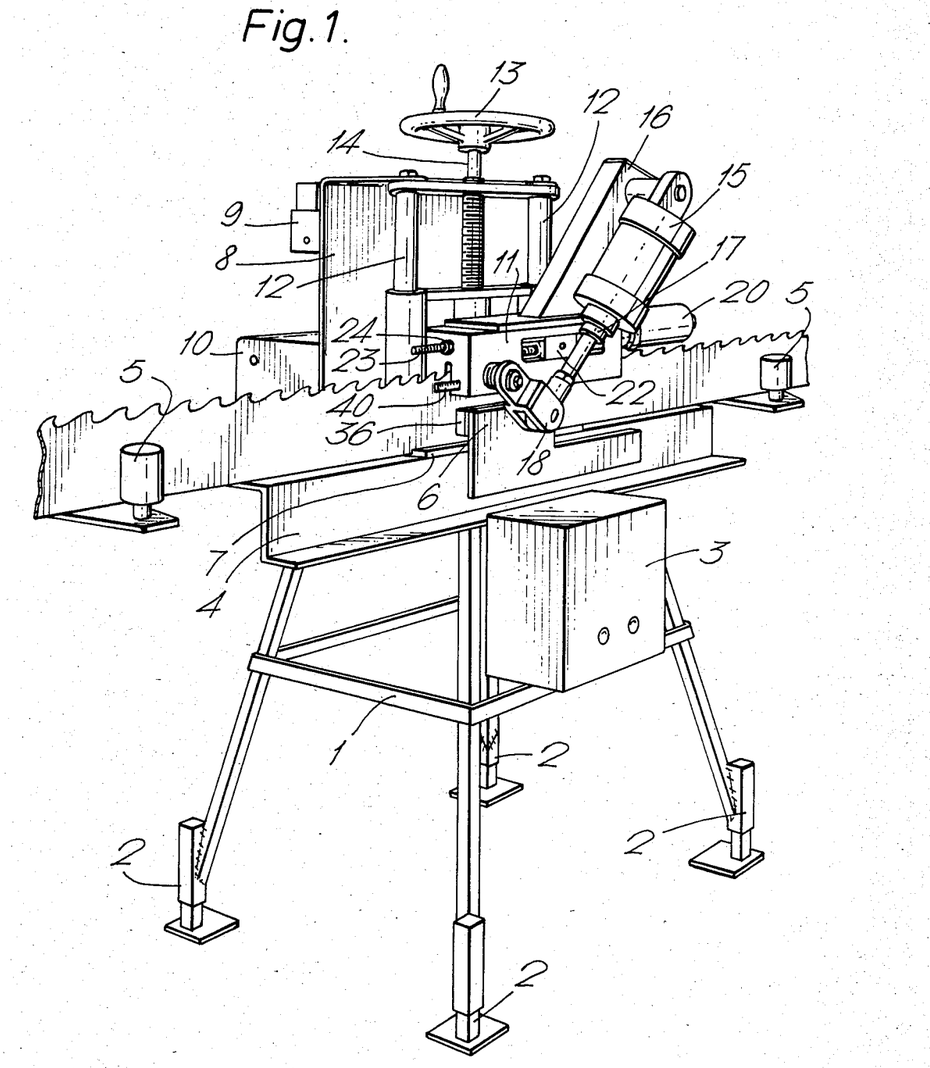
FIG. 1 is a view in perspective of the machine as adapted for treating band saw blades with its principal parts indicated.

Referring at first to FIG. 1, there is illustrated a base frame 1 with four legs 2, which can be adjusted to fit uneven floors, on which are mounted a control box 3, a saw blade path ledge 4, along which are arranged roller guides 5, a friction brake 6, and a guiding shoe 7 to keep the saw blade in place, and a tooling frame 8 with pneumatic 9 and electric 10 controls and a tooling block 11. The tooling block can be lowered and raised along guide posts 12 by turning the hand wheel 13 of adjusting screw 14, which accomodates for different saw blade widths. Electric cables and pneumatic hoses are omitted from the illustration for the sake of clarity.

Figure 2:
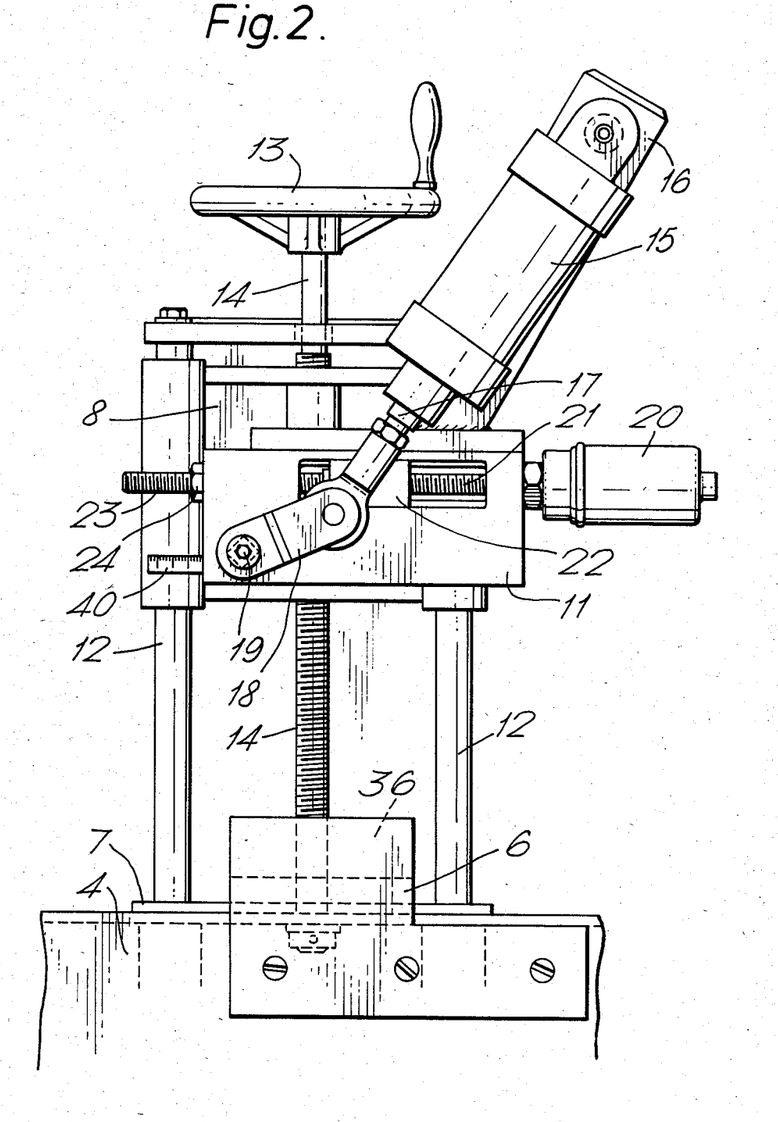
FIG. 2 is a view of the tooling frame as seen in a direction perpendicular to the plane of the saw blade.

FIG. 2 illustrates the principal parts of the tooling block 11. To accomplish the compressing force a double-acting pneumatic cylinder 15 is pivotally attached to the fixed extension 16. The piston rod 17 is connected pivotally to a lever 18 which pivots around axis 19. The advancement and longitudinal positioning of the saw blade is accomplished by the single-acting pneumatic cylinder 20 with its threaded piston rod 21 being screwed into sliding block 22. The sliding block meets the adjustable stop screw 23 when the piston moves outward. The stop screw is locked with lock nut 24. The ruler 40 indicates the correct position of the saw blade and its upper edge is exactly level with axis 19.

Figure 3:
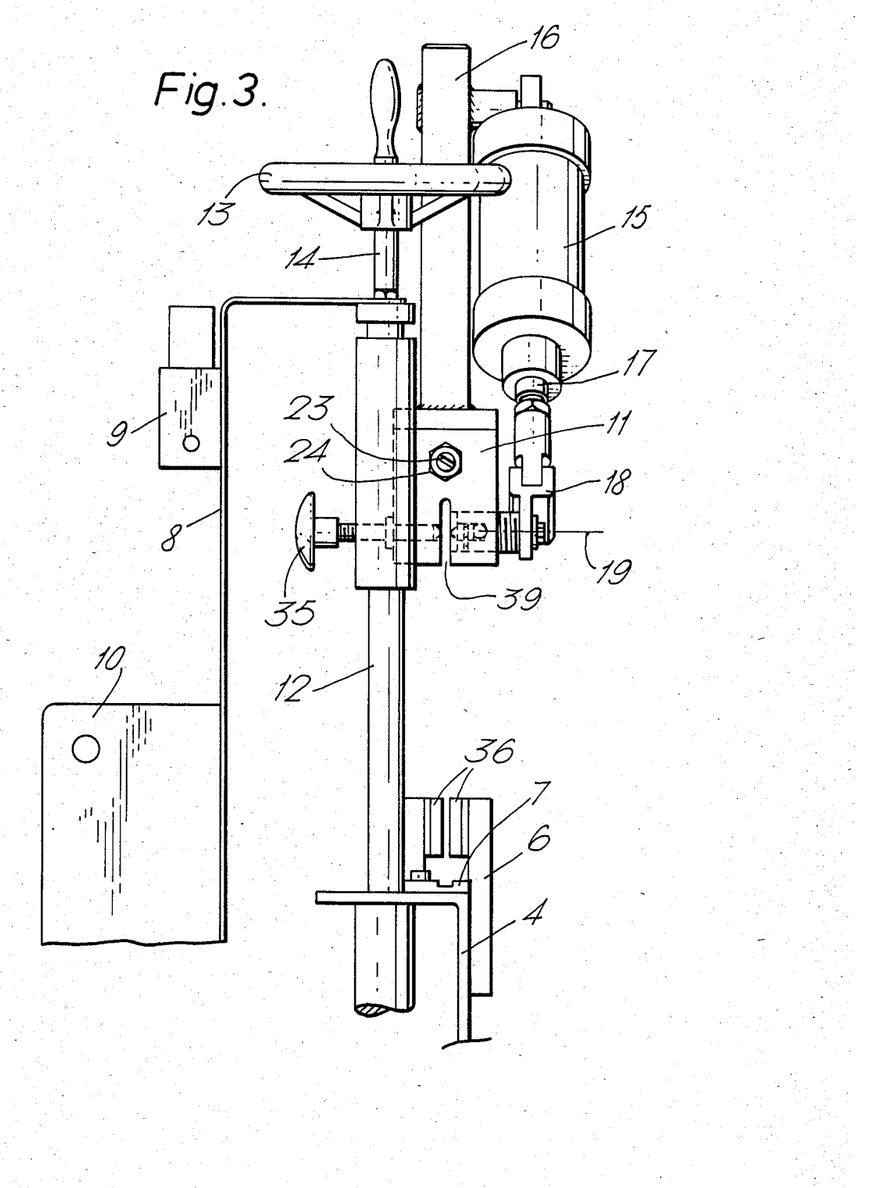
FIG. 3 is a view of the tooling frame as seen in a direction parallel to the plane of the saw blade.

FIG. 3 shows the tooling frame as viewed in the direction of the saw blade. The left hand die screw handle 35, the friction brake blocks 36 and the slot 39, in which the compression takes place, are indicated.

Figure 4:
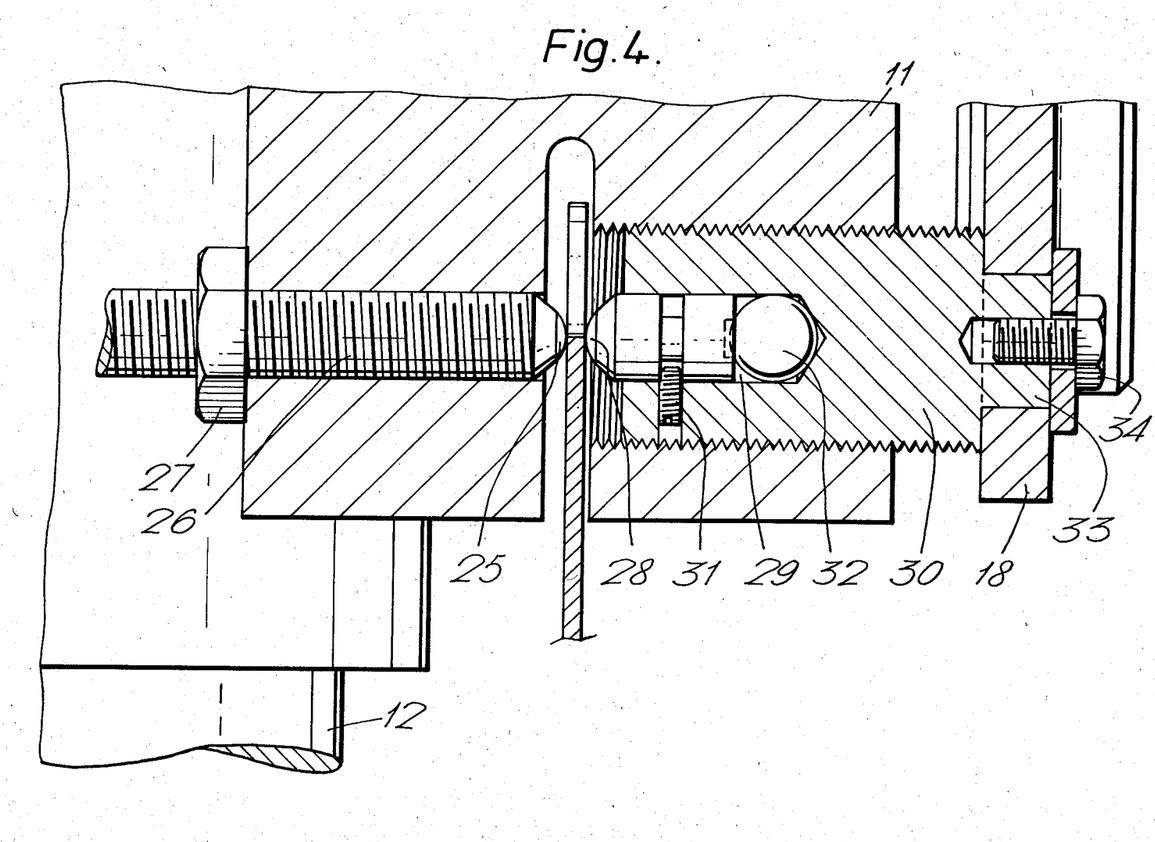
FIG. 4 is a sectioned enlargement of a part of FIG. 3.

FIG. 4 is a sectioned enlargement of a part of FIG. 3 and outlines the principal features of the compressing mechanism. The left hand die 25 is the fashioned end of screw 26 which is screwed through the block 11 and locked by lock nut 27. The right hand die 28 is mounted in a cylindrical hole 29 in the threaded member 30 and may rotate freely, but is forced by locking screw 31 to move axially as the member 30 is screwed outwards or inwards when the lever 18 is moved up or down. The pressing force is transferred from the threaded member 30 to the die 28 by the ball 32, which is loosely placed in the bottom of the hole. The lever 18 is connected to the member 30 by a square gudgeon 33 and secured by screw 34.

Figure 5:
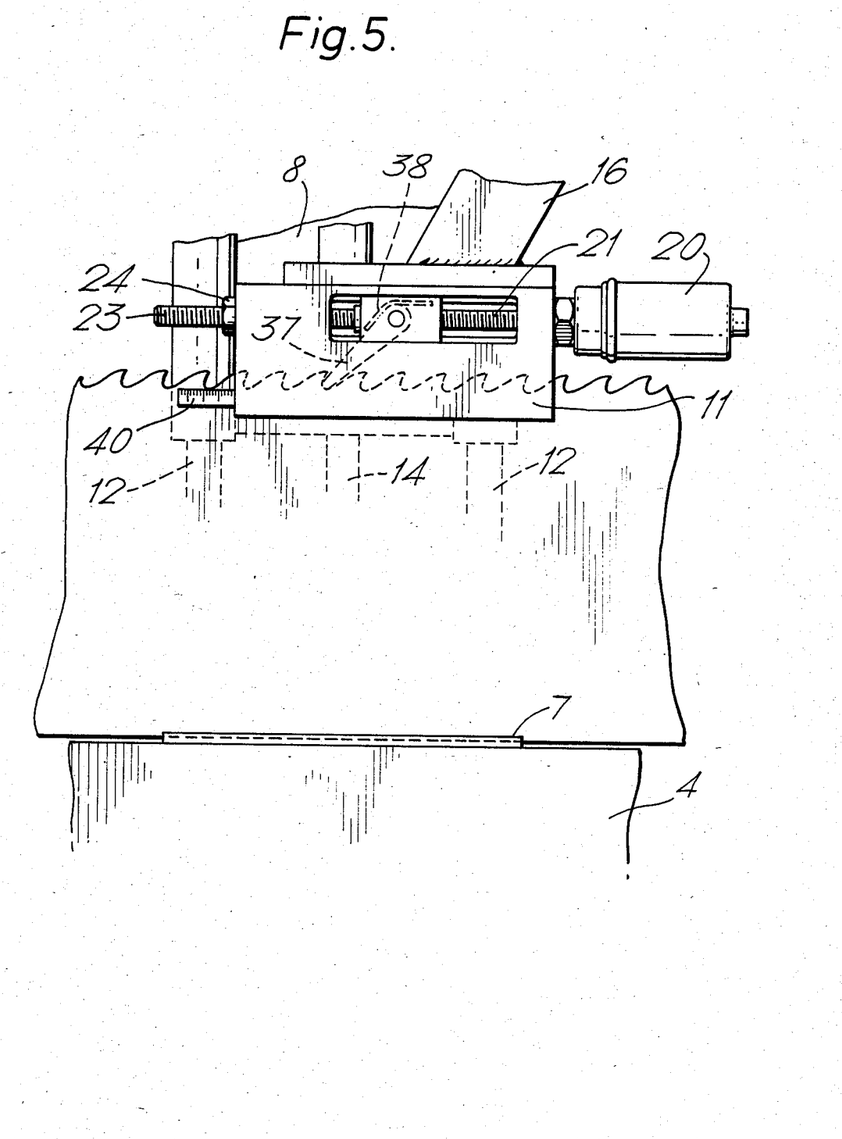
FIG. 5 is a view of the tooling block with the compression mechanism removed and the advancing mechanism outlined.

FIG. 5 is an illustration of the mechanism for advancing the saw blade one tooth pitch after each compression cycle. The tooling block 11 is shown without the compressing mechanism, and with a saw blade in place. Some of the obscured elements are outlined by dashed lines. When the piston rod 21 is retracted, the pivoting pawl 37, pressed down by reed 38, slides over the tooth point and falls down into the next gullet. When the piston moves outwards in the cylinder, the pawl pushes the saw blade one tooth pitch forward. The lock nut 24 allows for adjustment and fixation of the piston stroke length.

The details described above refer to illustrations of the machine as adapted for treating band saw blades, but the changes made when equipping a machine for the treatment of circular saw blades or frame saw blades are such that very few of the fundamental characteristics above or steps in the description of how the machine is used as outlined below are changed. Therefore, FIGS. 6 and 7 will suffice to clarify the particular features of the circular saw blade and frame saw blade treatment, respectively.

Figure 6:
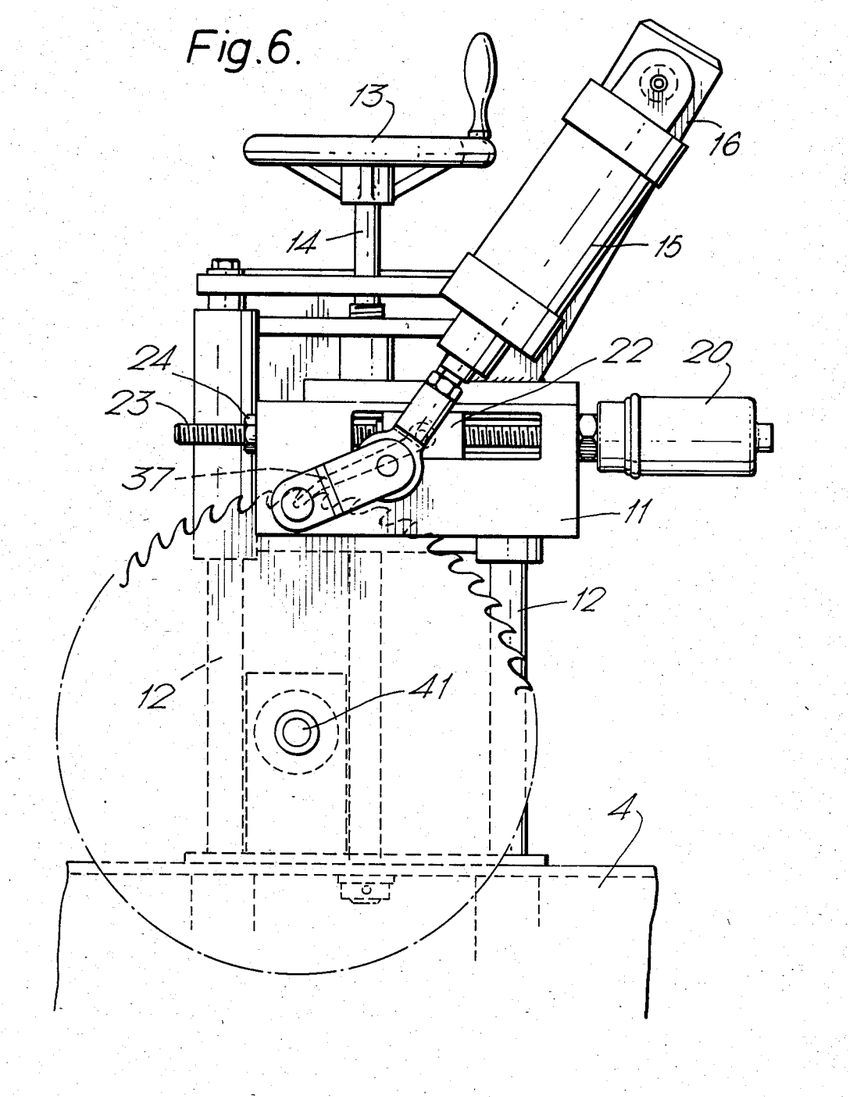
FIG. 6 is a view corresponding to FIG. 2 and FIG. 5, with the particular characteristics outlined which corresponds to using the machine for treating circular saw blades.

FIG. 6 shows a circular saw blade in place. The hub 41, with a chuck (conventional type, omitted from illustration), is movable up and down a ledge to make possible treatment of blades of various diameters. The pawl 37 forwards the blade one tooth pitch for each compression cycle. In this case said pawl pushes at the bottom of the gullet to be treated, and is therefore slightly notched at its end, in order that the compressing dies do not come into contact with the pawl point.

Figure 7:
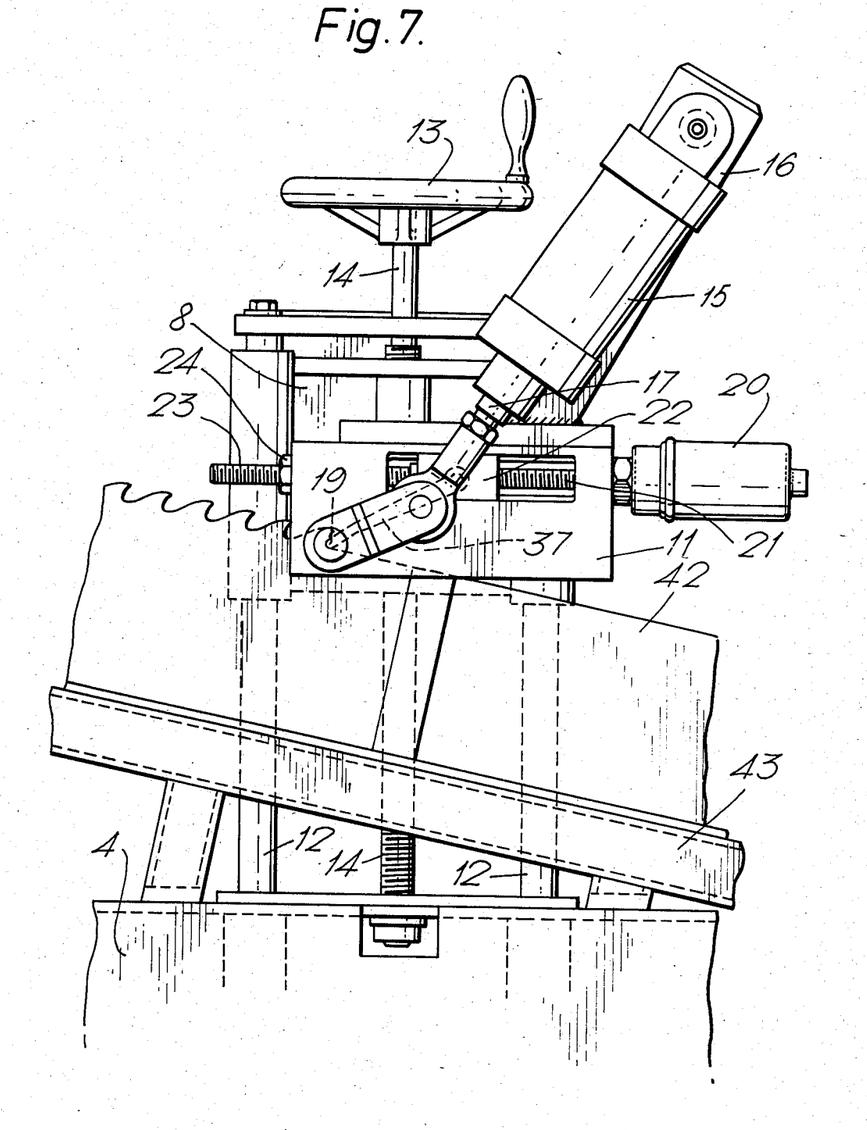
FIG. 7 is a view corresponding to FIG. 6, with the machine adapted to treating frame saw blades.

FIG. 7 shows a frame saw blade 42, the last gullet of which is in position to be deformed. It is seen that the saw blade ledge 43 in this case is inclined slightly, preferably about 12° upwards from the horizontal position. The forwarding pawl 37 in this case points to the gullet to be treated, as otherwise the last gullet of the blade would be left untreated. The pawl is therefore notched at its end, so that it does not come into contact with the compressing dies.

The steps described below for operating the machine are principally the same irrespective of which type of saw blade is being treated, even if it formally refers to the treatment of band saw blades. The circular saw blade requires adjustment of hub height and diameter according to the saw blade dimensions, and the frame saw blade requires extra care when treating the first few gullets, otherwise the description could be applied to any of the embodiments.

When the machine is to be used, the following steps are taken. The saw blade is first sharpened and tensioned. Before entering the saw blade into the compressing slot 39, the compressing dies are released and moved well apart. The threaded number 26 is retracted a few turns after the release of the lock nut 27 and the lever mechanism is activated and stopped with the lever 18 in its upper position, the member 30 and hence the die 28 thus being retracted.

The width adjustment screw 14 is then turned to lower the tooling block, until the upper edge of the ruler 40 is level with the lowest point of the saw blade notch.

Next the forwarding mechanism is adjusted to fit the tooth pitch at hand. The tooth pitch is measured, and the adjustment screw 23 is turned, until the first notch bottom is just at the ruler mark which corresponds to one tooth pitch. The notch position is zeroed with the forwarding pawl at its leftmost position. The forwarding mechanism is tested with the friction brake 6 active. When the notch bottom is at the appropriate mark on the ruler after each step forward, the adjusting screw is locked with the lock nut 24.

When this adjustment has been made, the pressing dies are correctly positioned for each saw blade notch. The next step is to adjust the degree of deformation. This is done by positioning the loosened threaded member 26 with the die head 25 so that the die just touches the side of the blade when the loose die 28 is in its inner position, i.e. with the lever arm 18 in its down position. Next, the mechanism is allowed to lift said lever arm, thus retracting member 30 and consequently also retracting member 28. The adjustable threaded member 26 is then turned for instance ⅛ of a full turn, locked with the lock nut 27, and the lever 18 is lowered to the pressing position. The notch just compressed is then forwarded and examined. If it is not deformed properly, i.e. if the depth of the dent is less than 12.5% of the blade thickness on each side of the blade, the adjustable threaded member 26 is turned another ⅛ of a turn. It is advisable also to adjust the position of the dent horisontally and vertically at this point, if necessary. When the blade thickness has been reduced by 25% by the compression and all lock nuts etcetera are secured, the machine can be started up. The first few unsufficiently deformed gullets may be fully compressed after the rest of the blade has been treated. It is recommendable to retension the blade after completed notch deformation.

I claim:

1. A machine for improving the resistance of saw blades, having a plurality of gulleted saw teeth, to cracks from fatigue stress by inducing deformation of the saw blade material at the gullets by application of local pressure to opposite sides of the saw blade at the saw tooth gullet causing stress exceeding the yield value of the saw blade material, said machine comprising:

(a) pressure applying means for compressing said saw blade material at said saw tooth gullet, said pressure applying means comprising:

first die means, having a first axis, for engaging a side of said saw blade at the saw tooth gullet, said first die means being rotatable about said first axis, said first die means being axially movable along said first axis;

second die means, having a second axis, for engaging a side of said saw blade at the saw tooth gullet, said second die means being rotatable about said second axis, said second die means being axially movable along said second axis;

first support means, having a third axis, for coaxially supporting said first die means for free rotation about said first axis, said first support means rotatable about said third axis, said first support means being axially movable along said third axis;

detent means for preventing relative axial movement between said first die means and said first support means;

second support means, operably connected to said first support means and said second die means, for supporting said second die means for free rotation about said second axis and said first support means for free rotation about said third axis with said first and second die means in coaxially opposed relationship on opposite sides of said saw blade, said second support means cooperating with said second die means so as to cause axial movement of said second die means upon rotation of said second die means about said second axis, said second support means cooperating with said first support means so as to cause axial movement of said first support means upon rotation of said first support means about said third axis;

means for releasably locking said second die means against rotation about said second axis;

means for rotating said first support means about said third axis;

(b) guide means for supporting said saw blade, said saw blade movable relative to said guide means;

(c) machine frame means for supporting said guide means;

(d) adjustment means, operably connected to said mechine frame means and said pressure applying means, to raise and lower said pressure applying means relative to said guide means so as to bring said coaxially disposed first and second die means into alignment with said saw tooth gullet;

(e) friction brake means, operably connected to said machine frame means, for applying a frictional force to said saw blade to inhibit movement of said saw blade relative to said guide means and said coaxially opposed first and second die means; and (f) saw blade moving means, operably connected to said pressure applying means, for applying a force to said saw blade to overcome the frictional force of said friction brake means and moving said saw blade one tooth pitch at a time relative to said guide means and said coaxially opposed first and second die means.

2. The machine as claimed in claim 1, wherein said second die means comprises a threaded member threadingly engaged in a corresponding aperture in said second support means, and said means for releasably locking said second die means comprises a lock nut.

3. The machine as claimed in claim 1, wherein said first die means comprises a first cylindrical member having an axis, said cylindrical member having a groove therein transverse to said axis.

4. The machine as claimed in claim 3, wherein said first support means comprises a threaded cylindrical member threadingly engaged in a corresponding aperture in said second support means, said cylindrical member having an axial recess therein having an open end and a closed end, said first cylindrical member receivable therein, a spherical member disposed intermediate said closed end of said recess and said first cylindrical member, a set screw threadingly engaged in a threaded aperture disposed transverse to said axial recess, said set screw engaging said groove in said first cylindrical member.

* * * * *